United States Patent
Padgett (10) Patent No.: US 6,421,524 B1
(45) Date of Patent: Jul. 16, 2002

(54) PERSONALIZED ELECTRONIC TALKING BOOK

(75) Inventor: Russell S. Padgett, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/583,383

(22) Filed: May 30, 2000

(51) Int. Cl.⁷ .................................................. G09B 5/00
(52) U.S. Cl. ........................................................ 434/317
(58) Field of Search ......................................... 434/317

(56) References Cited

U.S. PATENT DOCUMENTS

| | | |
|---|---|---|
| 3,592,098 A | 7/1971 | Zadig |
| 3,641,684 A | 2/1972 | Paige |
| 3,883,146 A | 5/1975 | Johnson et al. |
| 4,021,932 A | 5/1977 | Lipps |
| 4,245,404 A | 1/1981 | Yoshinari |
| 4,363,081 A | 12/1982 | Wilbur |
| 4,425,098 A * | 1/1984 | Doring .................... 434/317 X |
| 4,497,126 A | 2/1985 | Dejean |
| 4,636,881 A | 1/1987 | Brefka et al. |
| 4,703,573 A | 11/1987 | Montgomery et al. |
| 4,752,230 A | 6/1988 | Shimizu |
| 4,809,246 A | 2/1989 | Jeng |
| 4,884,974 A | 12/1989 | DeSmet |
| 4,990,092 A | 2/1991 | Cummings |
| 4,997,374 A | 3/1991 | Simone |
| 5,167,508 A | 12/1992 | McTaggart |
| 5,290,190 A | 3/1994 | McClanahan |
| 5,368,488 A | 11/1994 | Gentile |
| 5,374,195 A | 12/1994 | McClanahan |
| 5,417,575 A | 5/1995 | McTaggart |
| 5,419,705 A | 5/1995 | Sandvik |
| 5,437,552 A * | 8/1995 | Baer et al. ............... 434/317 X |
| 5,520,544 A * | 5/1996 | Manico et al. ........... 434/317 X |
| 5,567,163 A | 10/1996 | Ku |
| 5,595,489 A * | 1/1997 | Kwon .......................... 434/319 |
| 5,739,814 A * | 4/1998 | Ohara et al. ................. 345/173 |
| 5,954,514 A * | 9/1999 | Haas et al. ............... 434/317 X |
| 6,072,980 A * | 6/2000 | Manico et al. ........... 434/317 X |

OTHER PUBLICATIONS

ISD2532/40/48/64 Products, "Single–Chip Voice Record/Playback Devices 32–, 40–, 48–, and 64–Second Durations" (product data sheet), Information Storage Devices, Inc.; 2727 N. First St.; San Jose, CA 95134; pp. 2–91 thru 2–92.

* cited by examiner

Primary Examiner—Joe H. Cheng
Assistant Examiner—Chanda Harris
(74) Attorney, Agent, or Firm—Andrew J. Dillon (57) ABSTRACT

An electronic talking book and method of operation thereof. The electronic talking book includes a book unit that has a front cover, a back cover and a spline cover. The book unit further includes a number of modular core sheets, where each of the modular core sheets has a laminated leaf that includes a front side and an electronic side that has at least one visual image. The electronic talking book also includes an audio recording/playback apparatus, where the audio recording/playback apparatus includes an audio input means for receiving audible utterances associated with a selected one of the visual images. An audio output means is also provided for playing back the audible utterances when the associated visual image is selected for personalizing the audio presentation of the visual images. In a related embodiment, the electronic talking book further includes a storage device for storing the received audible utterances and a playback device for audio reproduction of the stored audible utterances. In an advantageous embodiment, the audio input means is a conventional microphone.

13 Claims, 7 Drawing Sheets

PERSONALIZED ELECTRONIC TALKING BOOK

BACKGROUND OF THE INVENTION

1. Technical Field

The present invention relates in general to apparatus and methods for combining audio signals with printed graphical information. Specifically, the present invention relates to an personalized electronic talking book for enhancing the comprehension and retention of information displayed graphically in a book utilizing a stored audio message. The stored audio information can then be changed and modified as a user's needs dictate.

2. Description of the Related Art

Comprehension of printed matter is a high priority of the educational system of our society. Comprehension of printed material is generally dependent upon a viewer's ability to interpret and relate visually perceivable information in accordance with previously acquired knowledge associated with that information. Various attempts have been made to produce aids to enhance the process of integration in order to improve a user's comprehension and understanding.

Among various devices available in the prior art are U.S. Pat. No. 3,592,098 to Zadig (1971), U.S. Pat. No. 4,021,932 to Lipps (1977), U.S. Pat. No. 4,245,404 to Yoshinari (1981), U.S. Pat. No. 4,363,081 to Wilber (1982), U.S. Pat. No. 4,497,126 to Dejean (1985), U.S. Pat. No. 4,636,881 to Bretka et al. (1987), U.S. Pat. No. 4,703,573 to Montgomery et al. (1987), U.S. Pat. No. 4,752,230 to Shimizu (1988), U.S. Pat. No. 4,809,246 to Jeng (1989), U.S. Pat. No. 5,167,508 to McTaggart (1992). These devices disclose several methods to highlight the printed material either for amusement or retention of the reader's attention.

In particular U.S. Pat. No. 4,884,974 to DeSmet (1989) discloses an interactive book and audio player assembly in which digitally stored information is retrieved from a ROM module located within the book. The stored information is played back when a bar code, located on each page, is reflected into a playback unit. Thus, with the aid of light and bar code information, the selected page's digitally stored information is reproduced so that the reader can hear what he is attempting to read. One drawback to this particular design is that once the audio player is engaged, the playback of the entire page cannot be halted. The user cannot go back and replay the information unless the page is closed and light is again allowed to activate the playback unit.

Both U.S. Pat. No. 5,567,163 to Ku (1996) and U.S. Pat. No. 4,997,374 to Simone (1991) utilize prerecorded magnetic tape to store audio information. In particular, Simone is comprised of two separate units; a two channel prerecorded program and a console unit with a work booklet. The changeable channel unit is comprised of a series of spoken words that are audibly reproduced by the console unit, and a series of control signals which are operative for actuating lights adjacent to pre-specified words in the work booklet. The two channel prerecorded audio program is comprised of a two channel cassette player or other device such as VCR. This device allows the user to interact with the book as the words are being reproduced. However, as in the case of DeSmet, once the audio sequence has been initiated, it cannot be stopped until it has been completed. In order for the user to replay the sequence again, the tape must be rewound to the location found where the desired audio sequence begins.

U.S. Pat. No. 4,990,092 to Cummings (1991) teaches the utilization of pressure sensitive switches, located on each page of the book, such that when a switch is depressed, information is accessed from a voice chip and replayed for a listener. This allows the user to proceed at his own pace and replay items as needed. However, the buyer of the device must purchase all the talking book components each time they purchase a book. Furthermore, the voice can not be re-recorded in a familiar sound which the user can identify with, such as their mother or father.

U.S. Pat. No. 5,419,705 to Sandvik (1995) utilizes a separate removable sound source in the form of a telephone handset that is keyed to a story in the book. Thus, the user imagines that he is participating in a conversation with the characters in the book. The keys of the handset are labeled with a picture icon that represents a character or object from the book. The design limitation is that the removable sound source and the book are inseparable.

In U.S. Pat. Nos. 5,290,190 and 5,374,195 to McClanahan (1994), and U.S. Pat. No. 5,417,575 to McTaggart (1995), audio/visual information is controlled via one or more switches located on each page of the book. As the user presses on the switch, usually overlaid with a graphical image, the audio message is played back describing the object selected. These devices allow the user to proceed at their own speed with immediate and direct feedback. One drawback to these designs is that all of the book components are purchased each and every time a book is purchased and the information is prerecorded in an unfamiliar voice or sound.

Accordingly, what is needed in the art is an improved talking book that mitigates the above-discussed limitations.

SUMMARY OF THE INVENTION

It is therefore an object of the invention to provide an improved electronic talking book.

It is another object of the invention to provide a method of personalizing the audio presentation of an electronic talking book.

To achieve the foregoing objects, and in accordance with the invention as embodied and broadly described herein an electronic talking book is disclosed. The electronic talking book includes a book unit that has a front cover, a back cover and a spline cover. The book unit further includes a number of modular core sheets, where each of the modular core sheets has a laminated leaf that includes a front side and an electronic side that has at least one visual image. The electronic talking book also includes an audio recording/playback apparatus, where the audio recording/playback apparatus includes an audio input means for receiving audible utterances associated with a selected one of the visual images. An audio output means is also provided for playing back the audible utterances when the associated visual image is selected for personalizing the audio presentation of the visual images. In a related embodiment, the electronic talking book further includes a storage device for storing the received audible utterances and a playback device for audio reproduction of the stored audible utterances. In an advantageous embodiment, the audio input means is a conventional microphone.

In another aspect of the present invention, a method for personalizing the audio presentation of an electronic talking book is disclosed. The method includes providing an audio recording/playback device having audio input means for receiving audible utterances. Next, the audio input means is utilize to customize the audio presentation of associated images in the electronic book whereby the audio presentation may be in a familiar voice to a reader of the electronic book.

The present invention introduces the broad concept of personalizing the audio presentation of associated printed material in an electronic talking book. It is well known that in the early stages of a child's development, the associative abilities of comprehension and understanding information, such as printed material, are most readily acquired utilizing familiar faces and voices, such as those of the child's parents or grandparents. The present invention discloses a novel talking book and method for personalizing the reading and instructional experience with the talking book. Unlike prior art talking books that provide pre-recorded talking books, the talking book of the present invention provides means for allowing, e.g., a child's mother or father or both, to record in their own voices the description or stories that accompany the printed material in the talking book.

In another embodiment of the present invention, the audio recording/playback apparatus is detachable from the book unit. In this manner, a single audio recoding/playback apparatus may be employed with a multiplicity of talking books with different subject matter.

In yet another embodiment of the present invention, the book unit further includes a number of modular core sheets. Each of the modular core sheets has a laminated leaf including a front side and an electronic side, where the front side has at least one visual image. In a related embodiment, the modular core sheets utilize a common circuit trace pattern. Furthermore, in an advantageous embodiment, the common circuit trace pattern is formed using flexible conductive material.

In another embodiment of the present invention, the audio recording/playback device is also adapted to receive an audio output device that, in an advantageous embodiment, is a headphone. It should be readily apparent to those skilled in the art that the audio output device may, in other advantageous embodiments, be a conventional speaker.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
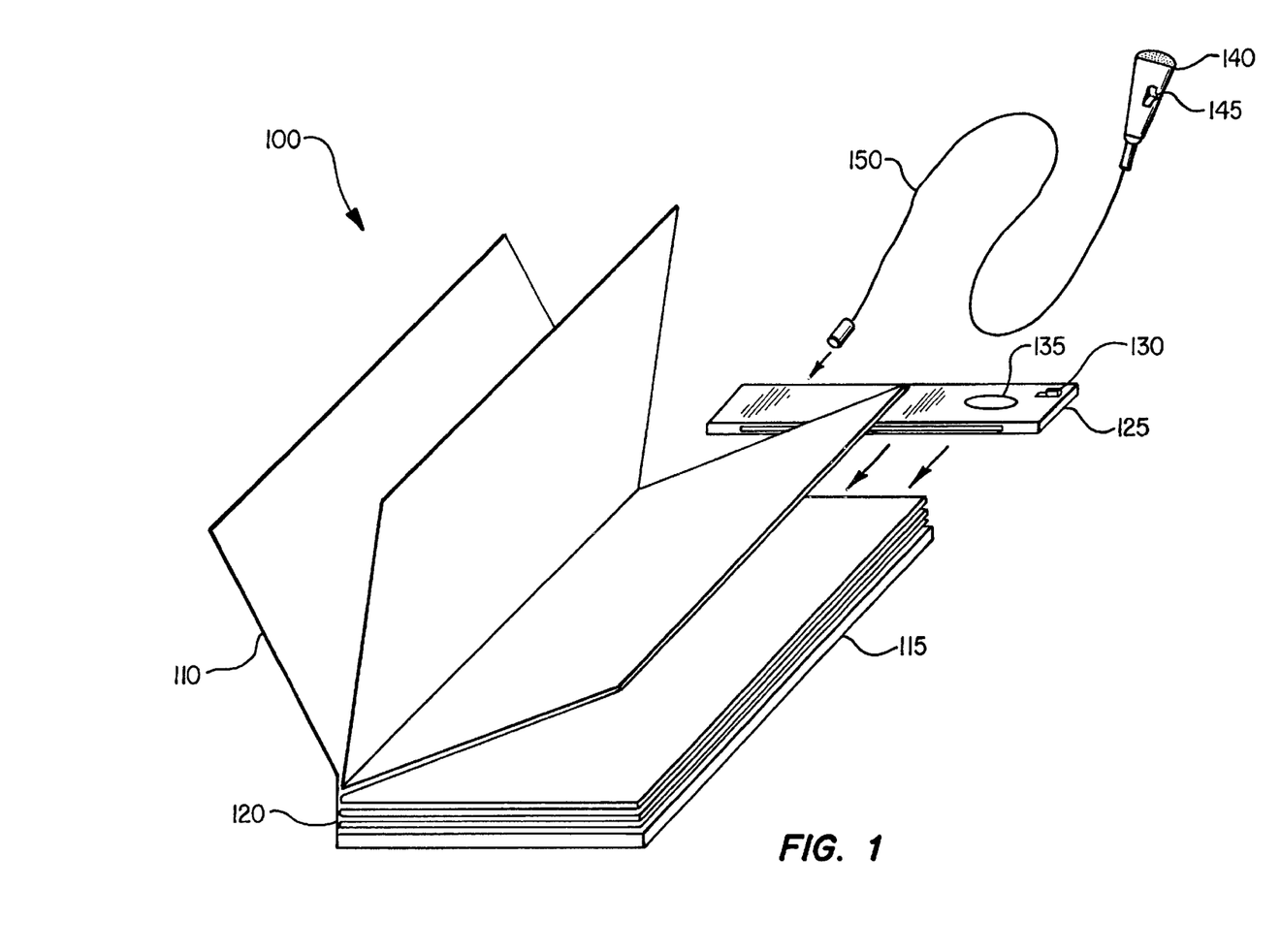
FIG. 1 illustrates an embodiment of an electronic talking book according to the principles disclosed by the present invention.

With reference now to the figures and in particular with reference to FIG. 1, there is depicted an embodiment of an electronic talking book 100 according to the principles disclosed by the present invention. Electronic talking book 100 includes a book unit having a front cover 110, a back cover 115 and a spine cover 120. Electronic talking book 100 also includes an audio recording/playback apparatus 125 that is detachable from the book unit.

Audio recording/playback apparatus 125 includes a system ON/OFF switch 130 that controls the operation of electronic talking book 100 and a speaker 135. Also shown in the illustrated embodiment is a recording unit having a recording device 140, such as a microphone, coupled to audio recording/playback apparatus 125 utilizing a microphone cable 150. In the illustrated embodiment, a microphone ON/OFF switch 145 is employed to control the operation of microphone 140. Although not shown, audio recording/playback device 125, in other advantageous embodiments, may also include an alternative audio reproduction capability, e.g., a headphone jack. The headphone jack, when utilized with conventional headphones, provides for personal private listening while viewing the material contained in the book unit.

Figure 2:
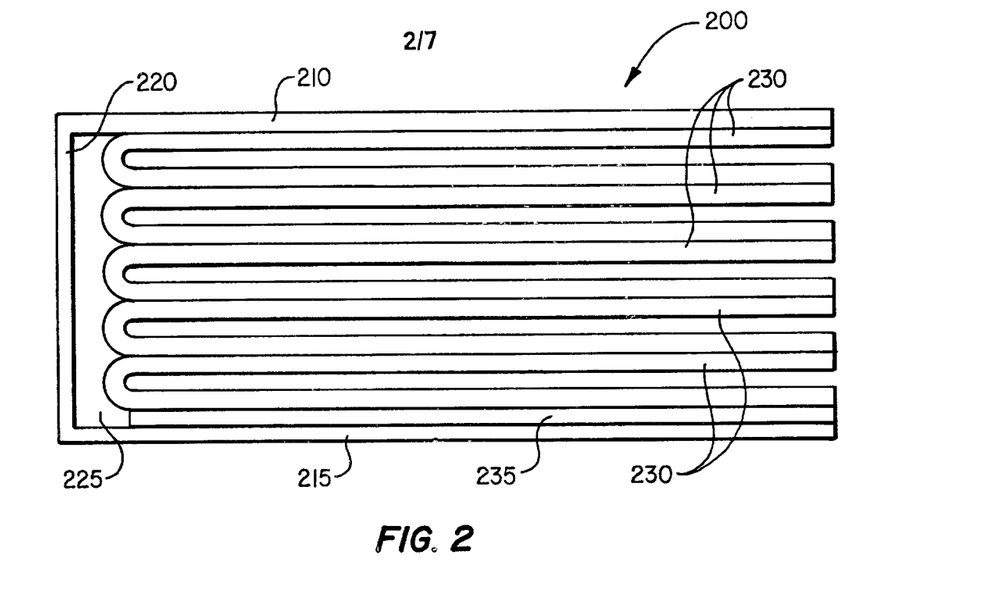
FIG. 2 illustrates a side view of an embodiment of the book unit depicted in FIG. 1.

Referring now to FIG. 2, there is illustrated a side view of an embodiment of a book unit 200 depicted in FIG. 1. As shown in the illustrated embodiment, book unit 200 includes a front cover 210, a back cover 215 and a spine cover 220 that cooperate to form the "outer skeleton" of book unit 200. A plurality of modular core sheets (or pages), generally designated 230 is disposed within book unit 200. Modular core sheets 230 are coupled directly to front cover 210 and indirectly to back cover 215 via an interface circuitry sheet 235. Interface circuitry sheet 235 couples all of modular core sheets 230 through a spine 225.

Figure 3A:
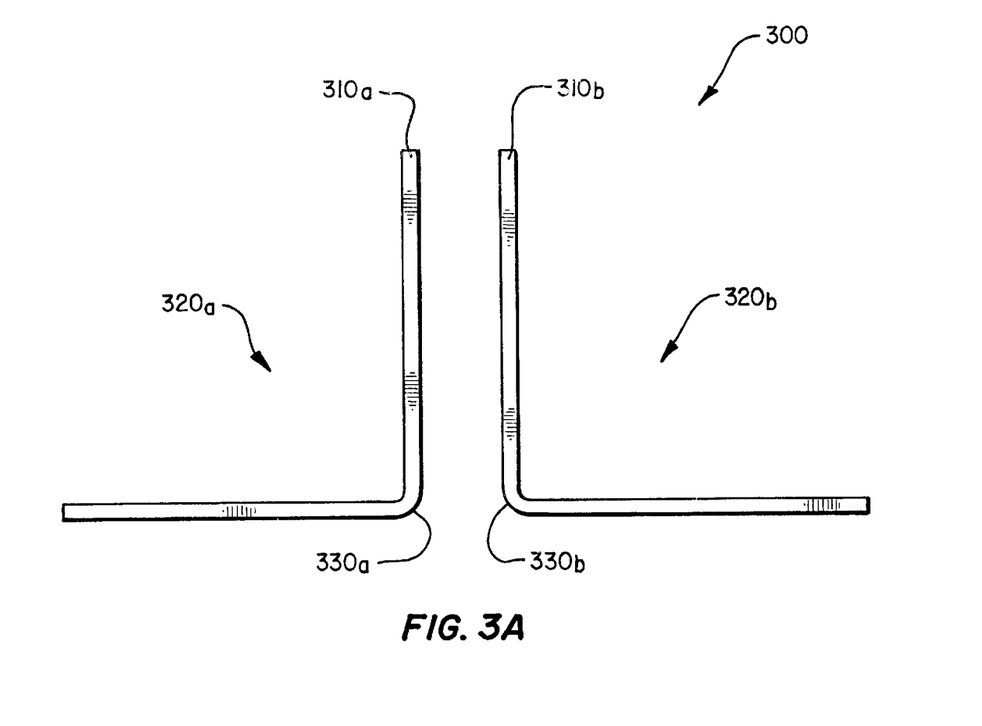
FIGS. 3A and 3B illustrate first and second modular core sheets that are located adjacent to each other within a book unit.
Figure 3B:
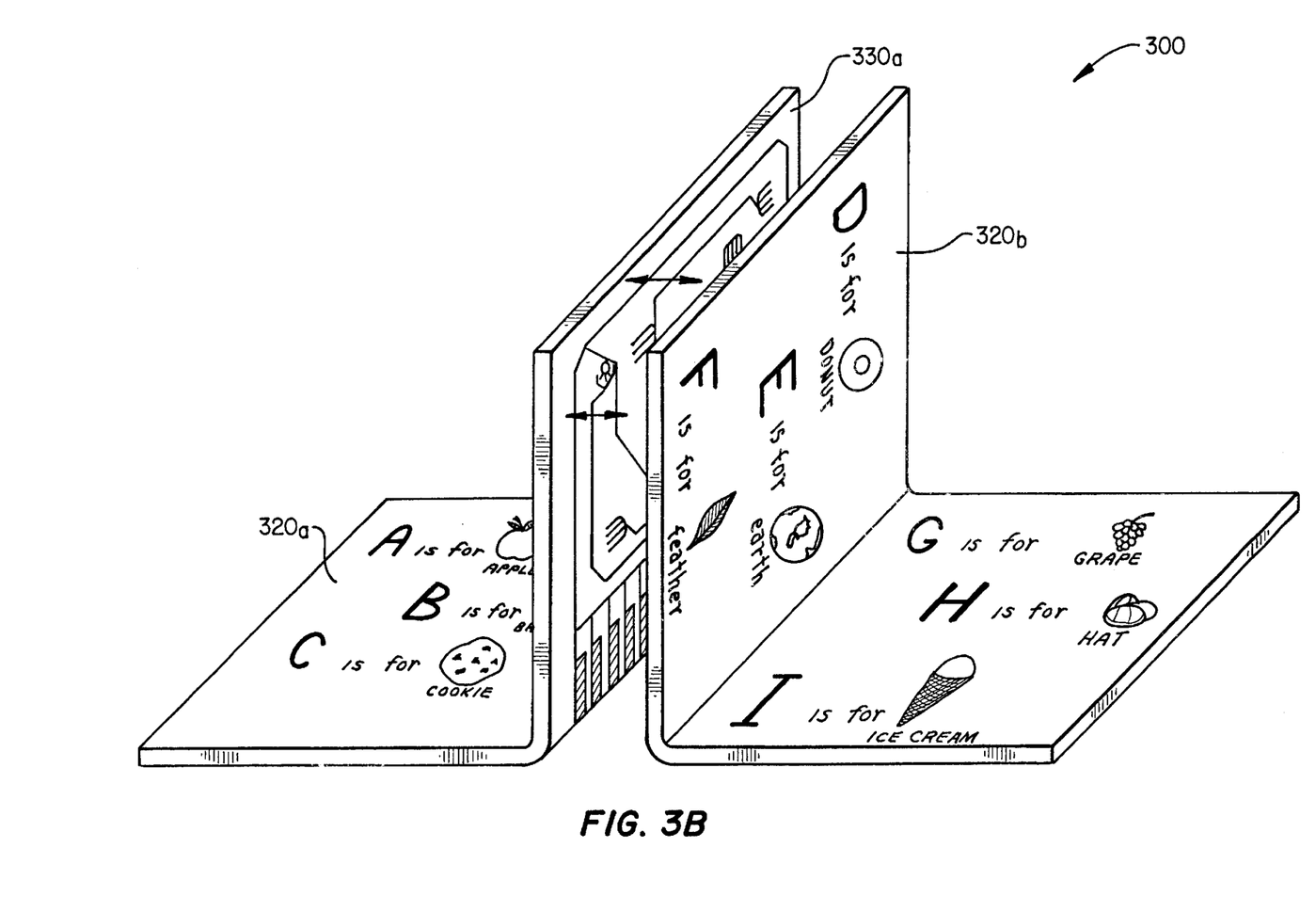

Referring now to FIGS. 3A and 3B, there are depicted first and second modular core sheets 310a, 310b that are located adjacent to each other within a book unit. Each of first and second modular core sheets 310a, 310b has a laminated leaf having a front side 320a, 320b and an electronic side 330a, 330b, respectively. The electronic side of each modular core sheet has a circuit board layer with an electrical circuit trace pattern. In an advantageous embodiment, a common circuit trace pattern is utilized for all the modular core sheets contained within the book unit. Furthermore, since first and second modular core sheets 310a, 310b are located adjacent to each other, they are mated, or joined, with their electronic sides, i.e., 330a, 330b. Since this configuration results in adjacent portions of the circuit board layer to be in direct contact with each other, it is necessary to protect the circuit board layer. In a preferred embodiment, the circuit board layer is coated with a layer of flexible dielectric paint, such as "37AC22 UV Curable Spacer" manufactured by the Olin Corporation of Ontario, Calif.

The front side of each of the plurality of modular core sheets, on the other hand, contains visual information that, in a preferred embodiment, is in the form of printed images as shown in FIG. 3B. Alternatively, in other advantageous embodiments, the information is in the form of alphabetical characters or other material suitable for affixation to the front side of a modular core sheet. It should be noted that the modular core sheet is typically composed of nonconductive material which is capable of accepting a flexible conductive material, e.g., a conductive ink. Any material suitable for making the modular core sheet's laminated leaves, such as paper or thin plastic that can be folded without breakage, is acceptable for use in the present invention.

Figure 4:
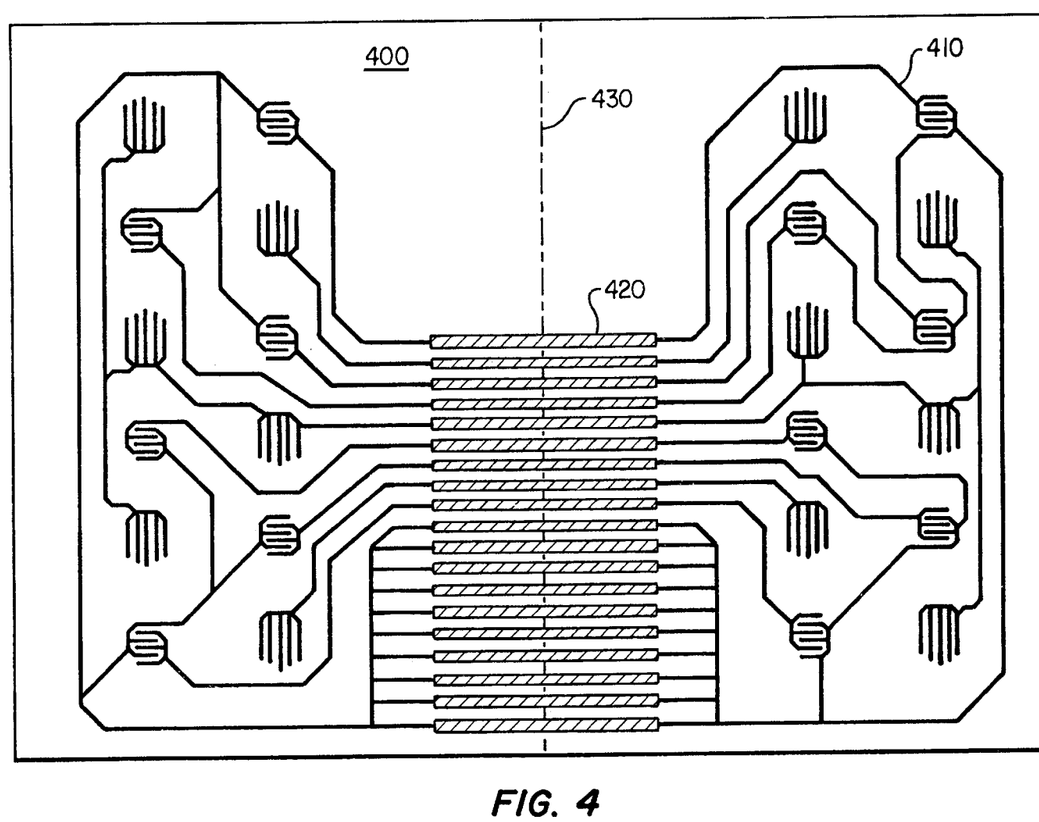
FIG. 4 illustrates an embodiment of an electronic side, or rear side, of a modular core sheet according to the principles disclosed by the present invention.

Referring now to FIG. 4, there is illustrated an embodiment of an electronic side 400, or rear side, of a modular core sheet according to the principles disclosed by the present invention. Electronic side 400 utilizes a common circuit trace pattern 410 that is coupled to a spline circuit trace. A dotted line, designated 430, down the middle of the modular core sheet depicts where the modular core sheet is folded to form a spine of a book unit. Generally, the fold line 430 is generated utilizing what is typically referred to in the bookmaking arts as "living-hinge" technology. This technique forms the hinge line by scoring or compressing the hinge line onto the material constituting the leaf of the modular core sheet. The material utilized may vary from pure paper to pure synthetic substances, including a variety of composite materials. The materials that may be advantageously employed in the formation of the modular core sheets are well known in the art and will not be described in greater detail hereinafter.

Figure 5:
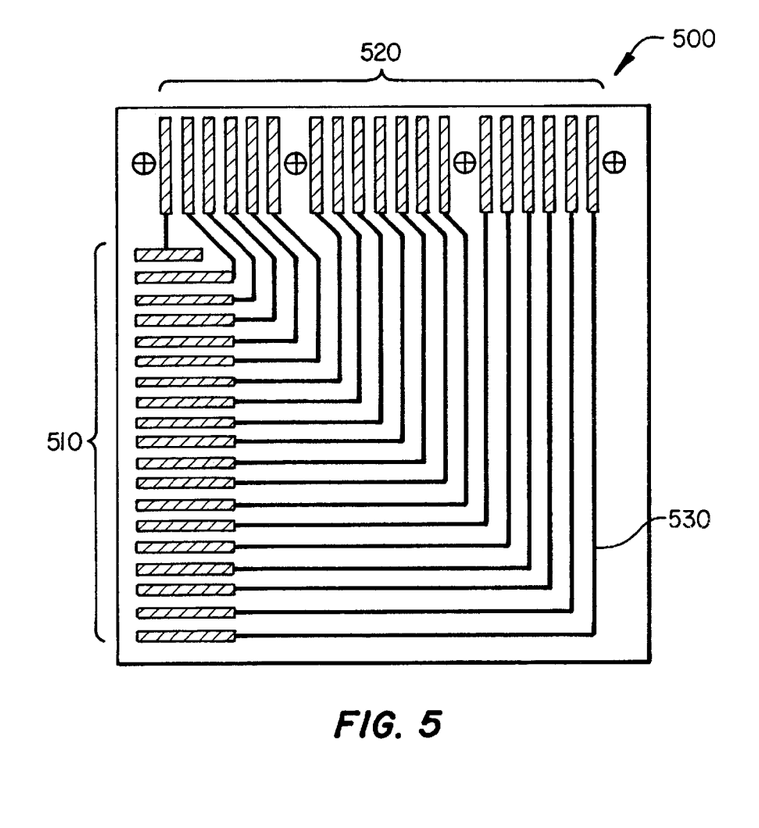
FIG. 5 illustrates an embodiment of an interface circuitry sheet (analogous to the interface circuitry sheet shown in FIG. 2)

Referring now to FIG. 5, with continuing reference to FIG. 4, there is depicted an embodiment of an interface circuitry sheet 500 (analogous to interface circuitry sheet 235 shown in FIG. 2). As described earlier, interface circuitry sheet 500 is joined to a book unit through the book unit's back cover and the plurality of modular core sheets contained within the book unit. After the modular core sheets have been folded along its center (see, e.g., FIG. 4), spine circuit trace 420 is mated onto a corresponding spine trace, generally designated 510, on interface circuitry sheet 500. This, in turn, will permit all electrical signals generated on the modular core sheets within the book unit to be transferred through signal traces 530 to interface circuit board traces 520.

Figure 6:
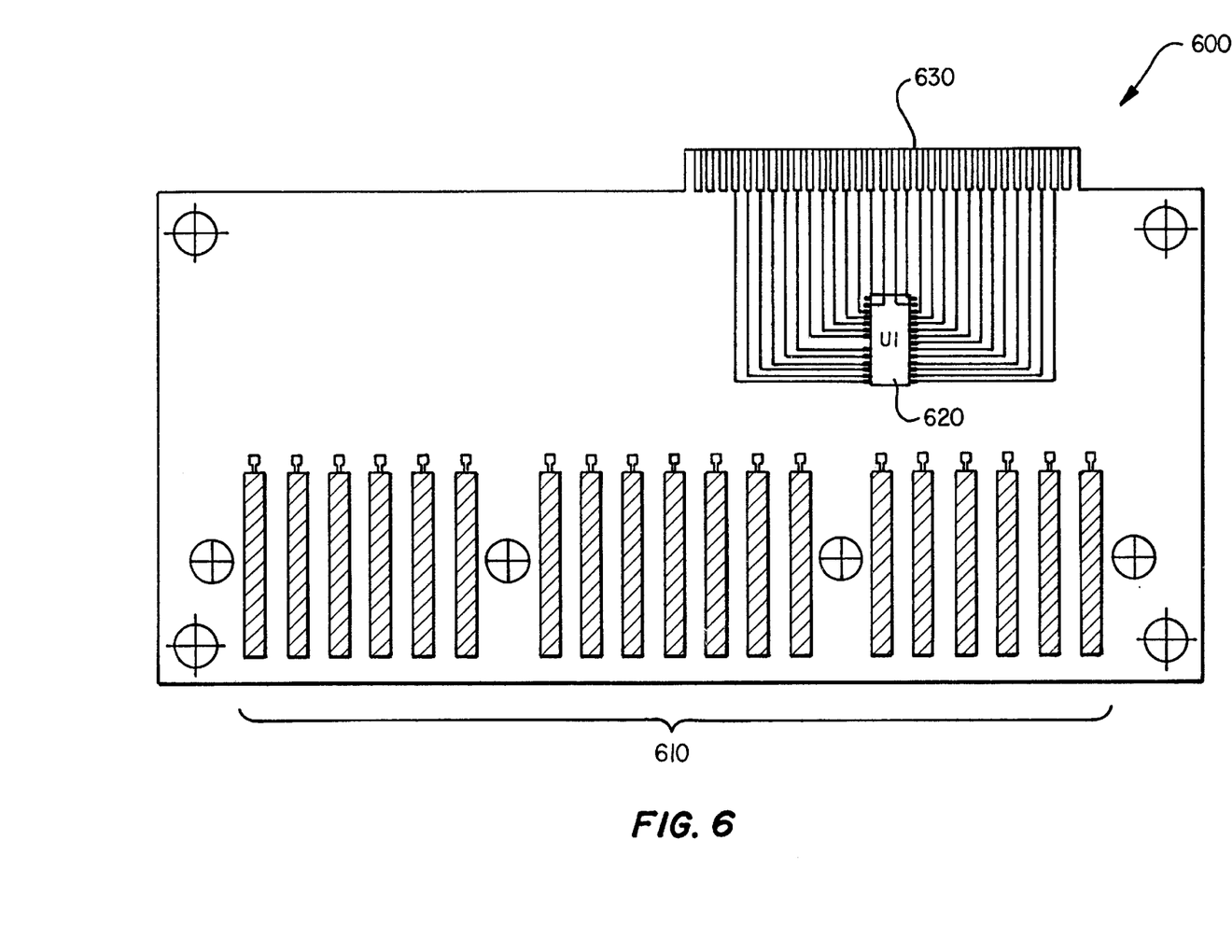
FIG. 6 illustrates an embodiment of an audio recording/playback apparatus interface board.

Referring now to FIG. 6, there is illustrated an embodiment of an audio recording/playback apparatus interface board 600. Audio recording/playback apparatus interface board 600, in a preferred embodiment, is physically contained within a book unit and is electrically coupled to an interface circuitry sheet, e.g., interface circuitry sheet 500 described in FIG. 5, through interface traces, generally designated 610. In an advantageous embodiment, all recorded information with respect to the book unit resides within a record/playback integrated circuit 620. Integrated circuit 620, in an advantageous embodiment, is a single-chip voice record/playback device, such as Information Storage Devices, Inc. of San Jose, Calif. ISD2500 ChipCorder device. The recorded information, along with the book unit's signal trace information, is accessible to an audio recording/playback apparatus through a book interface connector 630.

Figure 7:
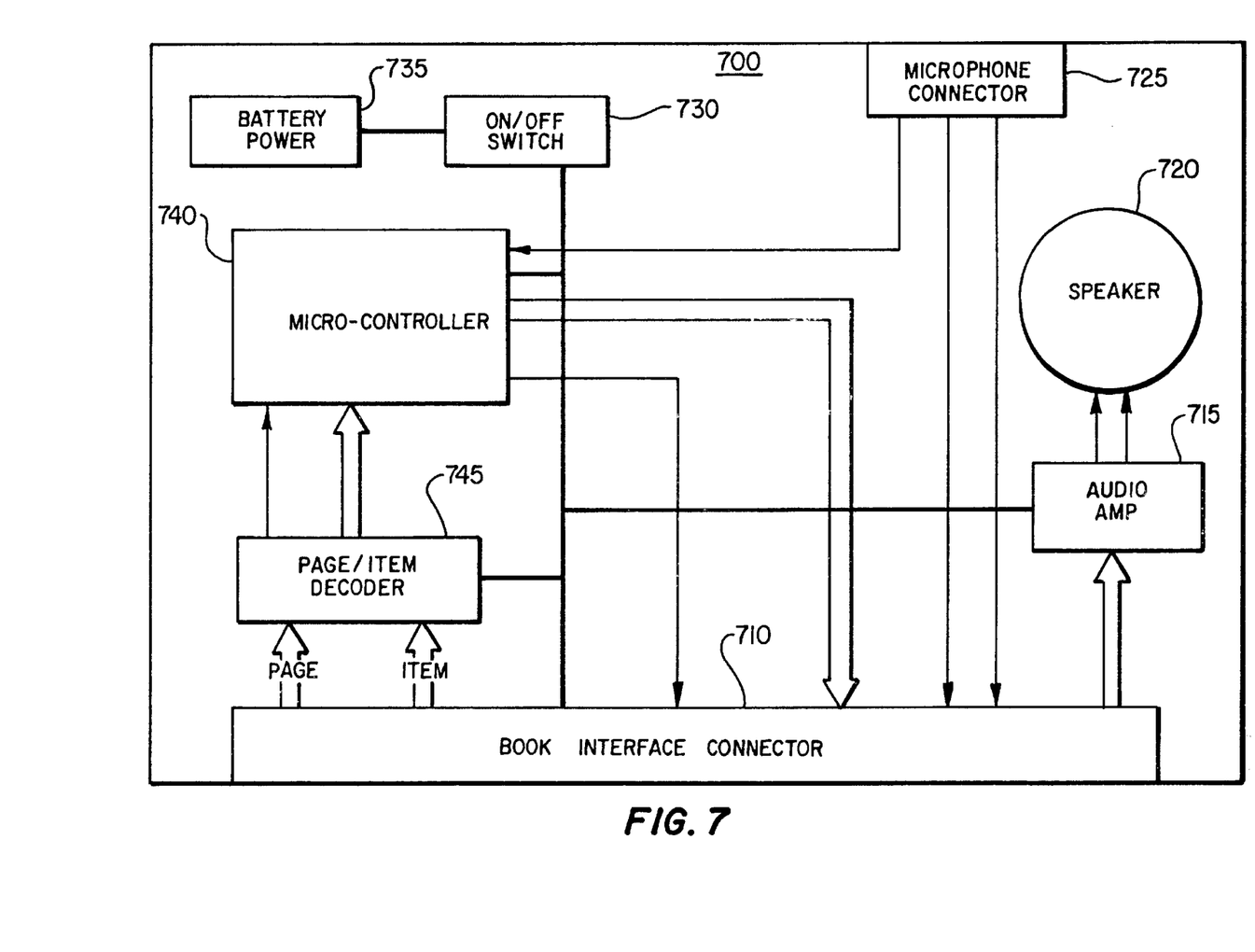
FIG. 7 illustrates a block diagram of an embodiment of the audio recording/playback apparatus depicted in FIG. 1.

Referring now to FIG. 7, there is depicted a block diagram 700 of an embodiment of audio recording/playback apparatus 125 depicted in FIG. 1. Electrical signals generated in a book unit are received at a book interface connector 710 that is coupled to a page/item decoder 745. By design, page/item decoder 745 translates the priority of the corresponding visual image that has been selected and/or depressed by its location within in a book unit. As discussed previously, each of the plurality of modular core sheets within the book unit utilizes, in a preferred embodiment, identical electrical circuit traces. Prioritization is based on the logical layout of the modular core sheets. This is achieved by mating logical page one, which has the highest priority, with logical page X (where X is the maximum number of pages in the book unit). Page X also has the additional characteristic of having the least priority of any page in the book unit. Thus, as a user progresses through the book, each odd page decreases in priority as its number increases. Conversely, each even number page increases in priority as its number increases. To illustrate, consider the first and second modular core sheets 310a, 310b depicted in FIG. 3A. Electronic side 330a of first modular core sheet 310a, i.e., page 1, is matted with electronic side 330b of second modular core sheet 310b.

After page/item decoder 745 decodes the prioritized signal received at book interface connector 710, the decoded signal is then provided to a micro-controller 740. Micro-controller 740, in turn, generates control signals to a book unit and a recording device, e.g., microphone 140 depicted in FIG. 1, via book interface connector 710 and a microphone connector 725, respectively. Recorded information, e.g., residing in integrated circuit 620 depicted in FIG. 6, is transmitted via book interface connector 710 to an audio amplifier 715 and broadcast utilizing a speaker 720 coupled to audio amplifier 715. Electrical power utilized in audio recording/playback apparatus 700 is provided by a battery 735 that is controlled by a selector switch 730.

Figure 8:
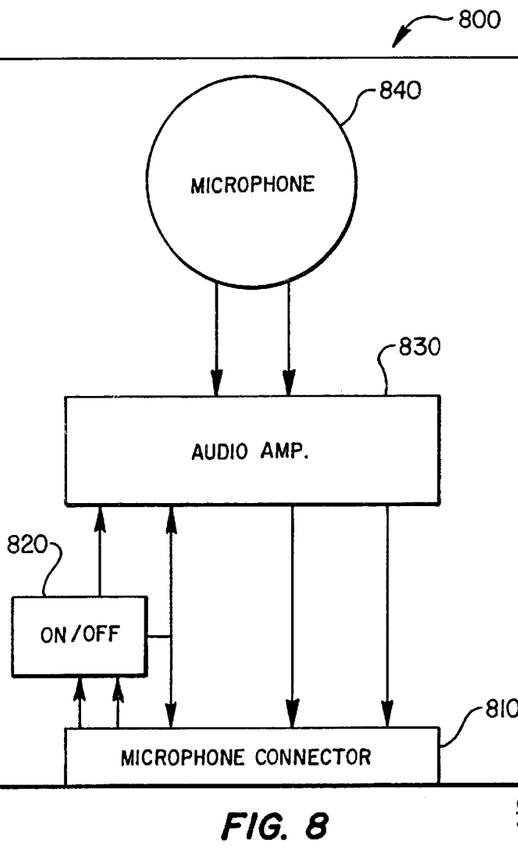
FIG. 8 illustrates a block diagram of an embodiment of the microphone illustrated in FIG. 1.

Referring now to FIG. 8, with continuing reference to FIG. 7, there is depicted a block diagram 800 of an embodiment of microphone 140 illustrated in FIG. 1. A microphone connector 810, which is a mating connector of microphone connector 725, is utilized to couple microphone 800 to audio recording/playback apparatus 700. Recording of information is enabled by a selector (ON/OFF) switch 820, coupled to microphone connector 810, that controls the application of electrical power from battery 735 to an audio amplifier 830. A microphone 840, coupled to audio amplifier 830, is utilized to record audible utterances. The audible utterances are then, in turn, provided to audio recording/playback apparatus 700 from microphone 840 through audio amplifier 830 and microphone connector 810.

FUNCTIONAL OPERATION

Playback Mode

To allow for proper operation of an electronic talking book in a playback mode, a book unit should be coupled to its associated audio recording/playback apparatus at the audio recording/playback apparatus' book interface connector. Furthermore, the audio recording/playback apparatus' selector switch should be in the "ON" position. A user may then initiate a playback sequence by touching an illustrated image on one of the modular core sheets within the book unit. When the user touches, i.e., depressing, a pressure sensitive switch is activated, completing a circuit. A resulting electrical signal is generated and transmitted along circuit traces, i.e., common circuit trace pattern 410, to a spline circuit trace on the modular core sheet.

This electrical signal is ultimately received at a micro-controller located in the audio recording/playback apparatus as a decoded page and item control signals that uniquely identify the page and specific image on the page. Consequently, the micro-controller initiates a playback sequence by sending the item information back to the integrated circuit in the book unit. The integrated circuit retrieves the stored recorded information and sends the information back to the audio amplifier in the audio recording/playback apparatus through the book interface connector. The audio amplifier, in turn, amplifies the stored information and proceeds to provide the amplified signals to a speaker, i.e., speaker 720, that broadcasts the audio signals.

Record Mode

For proper operation of the electronic talking book, the book unit, audio recording/playback apparatus and recording device, i.e., microphone 800, should all be coupled together. Furthermore, both selector switches, i.e., switches 735 and 820, should be set in the "ON" position. With both switches in the "ON" position, the micro-controller is notified that a recording operation and not a playback operation is being initiated. As with the playback mode described above, the user selects an image on one of the modular core sheets within the book unit by touching the image that, in turn, depresses an associated pressure switch. The selected image's information, e.g., page and item information, is decoded by the page/item decoder and passed on to the micro-controller that enables a recording session. The user, e.g., a family member of the recipient of the electronic talking book, such as a grandmother, proceeds to describe the selected image by talking into the provided microphone. This audio recitation, or audible utterances, is stored in the integrated circuit in the book unit. In a preferred embodiment, the recording of the audible utterances continues as long as the user is touching the selected image and terminates when contact with the selected image has ended. Alternatively, in another advantageous embodiment, the recording session is operational for a pre-determined period of time.

From the foregoing description, it should be noted that the electronic talking book is composed of pages, i.e., modular core sheets, that are identical in electronic construction. The visual information side of each page, which contain words or pictures, is different depending on the subject matter. The electronic side of each page, however, is identical to each other. This permits a single circuit layout for every possible subject matter, allowing manufacturers unlimited possibilities for production. Secondly, the electronic talking book utilizes a modular construction, i.e., the electronic talking book is composed primarily of three functional units: a book unit, an audio recording/playback apparatus and a recording device, e.g., a microphone. This modular approach allows users to be able to purchase common parts, such as the audio recording/playback apparatus and recording device, only once for use with book units having different subject matter. This, in turn, reduces overall product cost and facilitate interchangeability.

Additionally, since each page has identical circuit layout, item prioritization via the logical layout can be accomplished. As described previously, this is accomplished by mating logical page one, which also has the highest priority, with logical page X (where X is the maximum number of pages comprising the book). In contrast to page one, page X also has the least priority of any page in the book. Therefore, as the user progresses through the book, each odd numbered page decreases in priority as the page number increases while each even numbered increases in priority as the page number increases.

Furthermore, the stored audio information describing an associated image in the book may be "re-recorded." This allow different individuals to record information for replay at a latter time depending on who is going to "read" the book. The recorded information is also protected from inadvertent recording or erasure because of the modular nature of the book. The electronic book cannot record new information unless book audio recording/playback apparatus and recording device are coupled together and enabled, i.e., turned ON.

While the invention has been particularly shown and described with reference to a preferred embodiment, it will be understood by those skilled in the art that various changes in form and detail may be made therein without departing from the spirit and scope of the invention.

What is claimed is:

1. An electronic talking book, comprising:
    a book unit including:
    a front cover;
    a back cover;
    a spline cover; and
    a plurality of modular core sheets, each of said plurality of modular core sheets having a laminated leaf comprising a front side and an electronic side, said front side having at least one visual image and wherein said electronic sides of said plurality of modular core sheets employ a common circuit trace pattern; and
    an audio recording/playback apparatus, coupled to said book unit, wherein said audio recording/playback apparatus includes an audio input means for receiving audible utterances associated with a selected one of said visual images, and an audio output means for playing back said audible utterances associated with a selected one of said visual images for personalizing the audio presentation of said visual images.

2. The electronic talking book as recited in claim 1, wherein said audio recording/playback device further including:
    a storage device for storing said received audible utterances; and
    a playback device for audio reproduction of said stored audible utterances.

3. The electronic talking book as recited in claim 1, wherein said audio recording/playback apparatus is detachable from said book unit.

4. The electronic book as recited in claim 1, wherein said audio input means is a microphone.

5. The electronic book as recited in claim 1, wherein said circuit trace pattern is formed using flexible conductive material.

6. The electronic book as recited in claim 1, further comprising means for binding said plurality of modular core sheets together to form a spline.

7. The electronic book as recited in claim 1, wherein said audio recording/playback device is adapted to receive an audio output device.

8. The electronic book as recited in claim 7, wherein said audio output device is a headphone.

9. A method for personalizing audio presentation of an electronic talking book having a plurality of modular core sheets, comprising the steps of:
    utilizing modular core sheets having a common circuit trace pattern and wherein each of said plurality of modular core sheets has at least one visual image;
    providing an audio recording/playback device having audio input means for receiving audible utterances associated with a selected one of said visual images; and
    utilizing said audio input means to customize audio presentation of associated images in said electronic book whereby said audio presentation may be in a familiar voice to a reader of said electronic book.

10. The method as recited in claim 9, wherein said step of utilizing said audio input means includes the step of employing a microphone for recording said audible utterances.

11. The method as recited in claim 9, wherein said step of providing an audio recording/playback device further includes the steps of:

storing said received audible utterances in a storage device; and reproducing said stored audible utterances with a playback device.

12. The method as recited in claim 11, wherein said step of reproducing said stored audible utterances includes the step of adapting said audio/playback device to receive an audio output device.

13. The method as recited in claim 12, wherein said audio output device is a headphone.

* * * * *